June 23, 1959 D. E. SUNSTEIN 2,892,123

INDEX SIGNAL GENERATING MEANS

Filed June 1, 1956

INVENTOR.
DAVID E. SUNSTEIN
BY
Jacob Trachtman
ATTORNEY.

United States Patent Office 2,892,123
Patented June 23, 1959

2,892,123

INDEX SIGNAL GENERATING MEANS

David E. Sunstein, Bala-Cynwyd, Pa.

Application June 1, 1956, Serial No. 588,878
20 Claims. (Cl. 315—22)

Figure 6:
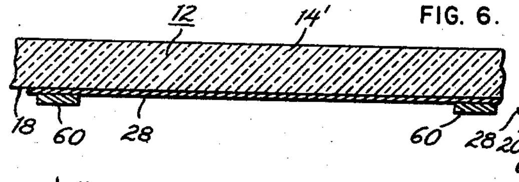

The invention relates to a signal indexing means, and more particularly to a signal generating means particularly adapted for color television.

The applicant's copending application entitled "Index Signal System" application Serial No. 588,877, filed June 1, 1956, presents claims to subject matter which is disclosed in this application but not claimed herein.

Heretofore, indexing means have been provided in color television systems for the purpose of determining the position of the scanning beam with regard to color generating strip elements for producing desired color representations. The indexing signal derived for such systems, however, has been unsatisfactory due to the contamination of the index signal by the phase and intensity variations of the scanning beam. For example, with variation in color to be presented, the phase is varied of the signal modulating the intensity of the cathode ray beam. This has affected the phase of the generated index signal in the prior art devices. Because of this, the derived index signal cannot precisely determine the position of the cathode ray beam. This in turn affects the color presented, so that the color rendition differs from that which should be presented.

It is therefore the primary object of this invention to provide a new and improved index signal generating means of greater accuracy and precision.

Another object of the invention is to provide a new and improved signal indexing means particularly adapted for color television systems.

Another object of the invention is to provide a new and improved index generating means for color television systems which minimizes contamination due to variations in intensity of the scanning beam and due to variations in the color to be presented.

Another object of the invention is to provide a new and improved index generating means which is reliable, effective, and efficient in operation.

Another object of the invention is to provide a new and improved index generating means for a color television system producing uncontaminated unambiguous and ambiguous index signals for high quality color reproduction.

Another object of the invention is to provide a new and improved index generating means for a color television system initially generating an unambiguous index signal which is followed by an ambiguous index signal for continuously producing an unambiguous index signal of low contamination during the process of color rendition.

Another object of the invention is to provide a new and improved index generating means for a color television system deriving an index signal from its cathode ray tube during the color rendition even during the presentation of dark or black colors.

Another object of the invention is to provide a new and improved index generating means for a color television system which combines color information signals with the index signals generated by the system for modifying the intensity of the cathode ray beam for high fidelity color reproduction.

Another object of the invention is to provide a new and improved index generating means for a color television system of high efficiency, low cost and good quality color reproduction.

The above objects of the invention as well as many other objects are achieved by providing a signal generating means for a color television system including a cathode ray tube comprising a member having a plurality of signal or color producing segments arranged in groups of color triplets occurring at a predetermined rate along a specified path, and means providing a cathode ray beam for sequentially exciting the groups of segments along said path.

A plurality of first index elements are provided which are arranged to occur at a predetermined rate along said path for sequential excitation by the beam of the cathode ray tube concurrent with the excitation of the groups of segments for generating a first index signal.

A plurality of second index elements are arranged to occur at a predetermined rate along said path preceding the first elements for sequential excitation by the beam of the cathode ray tube before excitation of the first elements for generating a second index signal.

The rates of the first index elements along said path is the product of a non-integral number greater than 1 multiplied by the rate of the groups of segments along the path, while the rate of the second elements along the path is the quotient of the rate of the groups of segments along the path divided by an integer.

A signal detecting means is excited by the first and second index signals generated by the cathode ray tube and has first and second output leads which respectively deliver the first and second index signals.

The phasing network which may be used with the index generating means comprises a frequency multiplier circuit and a frequency mixing circuit energized by the first and second index signals derived from the signal detecting means. The phasing network initially receives the second index signals for unambiguously determining the phase of its output signals, and thereafter is energized by the first index signals until the beam of the cathode ray tube completes the scan of said path. The output signal from the phasing network has a frequency which is equal to the rate at which the beam scans the triplet groups and a phase which corresponds to the relative position of the beam with respect to said triplet groups.

A color mixing signal circuit may then receive the unambiguous index signal which is produced by the phasing network at triplet frequency, a color reference signal, and a chroma signal. The color mixing circuit produces an output signal of triplet frequency which has had its amplitude modulated to correspond with the color saturation to be presented, while its phase is varied to correspond with the hue to be produced.

The output signal from the color mixing circuit may now be further modulated by a luminescence signal which adds further information to the color signal. The average value of the luminescence signal may be clamped or controlled to prevent cut-off of the cathode ray tube over a great many color triplets, which could otherwise interrupt the maintenance of proper phasing out of the phasing device.

The color information signal may be further modulated by the blanking signal which effectively cuts off the cathode ray beam during retrace periods of the scanning beam. The resulting composite signal is delivered to the control electrode of the cathode ray tube for modulating the intensity of the cathode ray beam to present a color rendition of high quality and fidelity.

Thus the amplitude of the modulated triplet frequency signal determines the saturation, while its phasing determines the hue, and the D.C. value of the signal varies the brightness or luminescence of the colors rendered by the system.

Although the index generating means is illustrated in connection with a color television system, it is not limited in its application.

Figure 1:
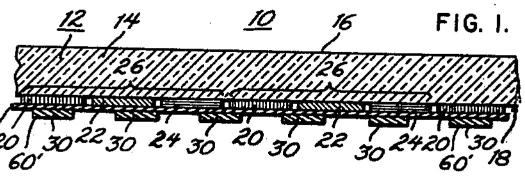
Figure 7:
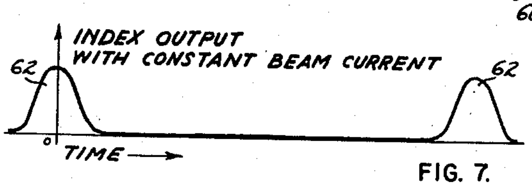
Figure 2:
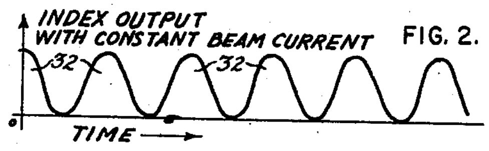
Figure 3A:
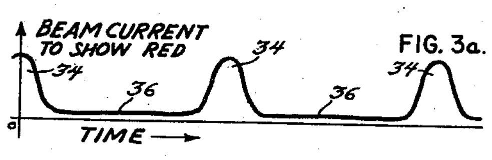
Figure 3B:
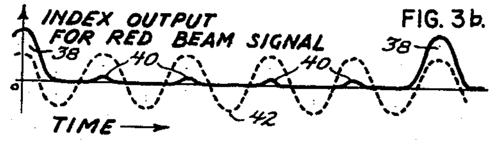
Figure 8:
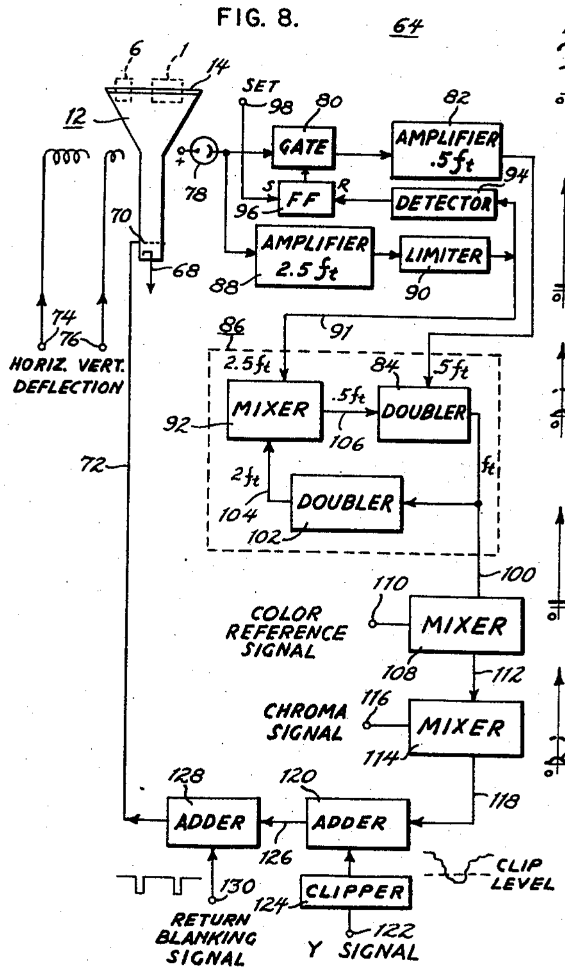
Figure 4A:
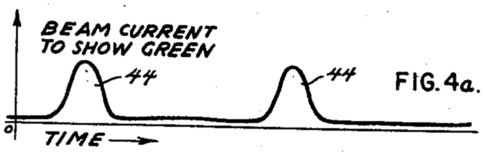
Figure 4B:
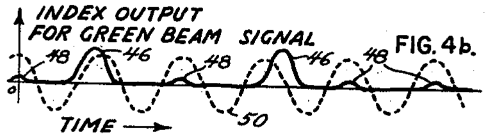
Figure 5A:
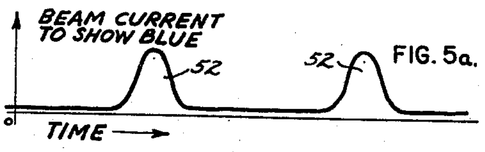
Figure 5B:
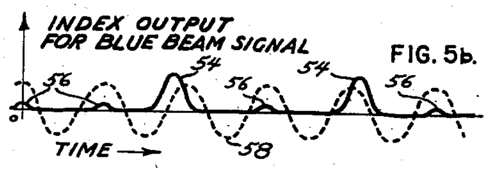

With the foregoing discussion in mind, this invention will be most readily understood from the following detailed description of a representative embodiment thereof, reference for this purpose being had to the accompanied drawings, in which:

Figure 1 is an enlarged view in cross-section of a portion of the screen of a cathode ray tube made in accordance with the invention, Figure 2 illustrates in graphic form the index signal generated with constant beam current, Figure 3*a* illustrates in graphic form the modulation of the beam current for a red presentation, Figure 3*b* illustrates in graphic form the index signal generated by the beam signal for a red presentation, Figure 4*a* illustrates in graphic form the modulation of the beam current for a green presentation, Figure 4*b* illustrates in graphic form the index signal generated by the beam current for a green presentation, Figure 5*a* illustrates in graphic form the modulation of beam current for a blue presentation, Figure 5*b* illustrates in graphic form the index signal generated by the beam current for a blue presentation, Figure 6 is an enlarged fragmentary view in cross-section of a portion of the screen member which is to the left of its portion shown in Figure 1 and is impinged by the scanning beam at the beginning of each line before impinging upon the portion shown in Figure 1, Figure 7 illustrates in graphic form the index signal generated by the cathode ray beam by its impingement upon the portion of the cathode ray tube shown in Figure 6, and Figure 8 diagrammatically illustrates in block form a color television system utilizing the index generating means of the invention.

Like reference numerals designate like parts through the several views.

Refer now to Figures 1 to 5 inclusive for a detailed description of an index signal generating device 10 which is particularly described in the form of a cathode ray tube 12.

The cathode ray tube 12 is provided with a glass face or viewing screen member 14 having an outer viewing surface 16 and an inner surface 18. The Figure 1 is a horizontal section of the viewing screen member 14. The inner surface 18 of the screen member 14 of the cathode ray tube 12 is provided with pluralities of parallel horizontally displaced vertical strip segments 20, 22, and 24. The strip segments 20, 22, and 24 are arranged in sequence so that each serial arrangement of segments 20, 22, 24 forms one of a plurality of triplet groups 26.

The segments 20, 22, 24 when impinged by a cathode ray beam each produces a light signal. For instance, the segment 20 may be made of a phosphor which produces red light, while segment 22 is made of a phosphor generating green light, and the segment 24 is composed of a phosphor radiating blue light. The segments 20, 22, 24 may be positioned across the screen member 14 so that a cathode ray beam sweeping horizontally across the screen member 14 will impinge upon 300 to 500 or more triplet groups 26 for each line scanned. The phosphor strips may be deposited by the conventional manner by techniques known in the art. As an alternative, all of the segments 20, 22, 24 may be made of a material producing a white light, and a filter material having strips passing selected colors may be utilized, as well as other such arrangements.

An aluminum layer or coating 28 may be provided over the segments 20, 22, and 24. The aluminum coating such as now generally used in television tubes, is transparent to electrons but opaque to light. Thus, the aluminum coating 28 will not interfere with the impingement of electrons upon the segments of the groups 26, while reflecting the light produced by the segments of the triplet groups 26 towards the outer surface 16 of the screen member 14. The aluminum layer 28 also serves to prevent the transmission through the screen member 14 of light generated within the cathode ray tube. The aluminum coating 28, because of its conductivity, also serves to equalize potentials along the inner surface 18 of the screen member 14.

A plurality of index elements 30 are received on the inwardly facing surface of the aluminum layer 28. The index elements 30 are equally spaced vertical strips which are horizontally spaced or displaced across the surface of the aluminum layer 28. In this relationship, the vertical index strip elements 30 are also disposed similar to the segments 20, 22, 24 of the triplet groups 26.

The index elements 30 may be made of a phosphor of short persistence or of a material having a secondary emission different than the secondary emission of the aluminum layer 28.

The various strips of the first segments 20, 22, 24 as well as the index strip elements 30 may be separately and sequentially formed by well-known techniques. For instance, the segments (20, 22 or 24) made of a phosphor which is to produce one of the given colors, may first be produced by the silk screening technique, while the segments for the other colors are sequentially produced in their turn. The aluminum coating is then deposited, and the index elements 30 are formed by a final silk screening process.

Well known photo-chemical techniques may also be applied, in which each desired phosphor compound is separately combined with a photo sensitive resist of gelatinous composition. The coating of the resist for the particular phosphor strips being formed is applied before it has hardened to the inner surface 18 of the screen member 14. The coating is exposed to light except in the areas which are to be removed leaving exposed the strip areas where the particular phosphor strips are to be formed. The areas unexposed to light may be dissolved and washed away by an appropriate chemical solution. In this manner the various strips are in sequence deposited in the proper relationship and form required. After the aluminum coating 18 has been formed over the segments 20, 22, 24 the index generating strip elements 30 may be likewise formed.

A suitable short persistence phosphor which may be employed for the index segments is zinc oxide, although certain other materials well known in the art may also be utilized. If the index generating elements are to be formed of a material having a secondary emission differing from that of the aluminum layer 28, then a material such as carbon may be satisfactorily utilized.

The gelatin of the resist carrying the phosphor which forms the segments and elements and which has not been washed away, may be removed by a suitable baking action causing it to volatilize. This leaves the phosphor material of these segments and elements substantially free of the binder or carrier utilized in their formation.

The index elements 30 will produce a light signal when made of a phosphorescent material when impinged by the cathode ray beam which can be detected by a photoelectric cell. When the elements 30 are made of a material producing a secondary emission which differs from that of the aluminum layer 28 when impinged by the beam, a voltage signal will be produced at a collector element of the cathode ray tube 12. Thus, depending upon the construction used, the photo-electric cell or the collector element will detect the indexing signal generated by the index elements 30.

It is noted that the groups 26 of the segments 20, 22, 24 occur at a constant rate along a substantially horizontal line or path traversing the groups 26. Likewise, the index segments 30 also occur at a predetermined constant rate along such a path. The relationship of the rates of occurrence of the groups 26 of the segments and the rate of occurrence of the index elements 30 along said path is of importance in minimizing the contamination which, in prior art device, resulted from the variation of intensity and phase of the scanning beam for the production of different colors.

If, as in the prior art devices, one index element 30 is provided for each group 26, or if one segment 30 is provided for each segment 20, 22, 24 of the group 26, then, serious contamination will result.

In the case where a single element 30 is used for each triplet group 26, the index signal generated and its phase will depend upon the color produced by the device. For example, when the elements 30 are respectively positioned over the red phosphor segments 20, an index signal will be produced by the impingement of the beam upon the red segment 20 and the index element 30. However, when a green or blue color is to be rendered, the cathode ray beam impinging upon either the green or the blue segments 20, 24, does not impinge upon the segment 30, thereby, failing to produce an index signal. If the segments 30 are of sufficient dimensions, then, the cathode ray beam will impinge upon them, but at a time which alters the phase of the index signal. This generates an index signal having a phase which varies with the color being rendered. This is a contaminated signal, which does not positively relate the position of the cathode ray beam to the respective segments of the triplet groups 26.

In the case where the segments 30 are positioned with one of the index elements 30 over each of the respective segments 20, 22, 24 of the triplet groups 26, a similar shift in phase of the index signal occurs with the variation of the color rendered. This undesirable contamination is substantially reduced and practically eliminated by the occurrence of the index elements 30 along said path at a rate which is the product of a non-integral number greater than 1 multiplied by the rate of the triplet groups 26 along said path. Thus, the rate of the index elements 30 may, for example, be substantially 1½, 2½, 3½, 4½, 5½ and so forth times the rate of the triplet groups 26 along said path. The illustration of Figure 1, is a preferred embodiment, in which the rate of the segments 30 is two and a half times the rate of the triplet groups 26 along a horizontal path traversing the groups.

It is noted that a rate of index elements 30 with respect to the triplet groups 26 of substantially 1½ produces a satisfactory index signal, while the increase of this rate, to values in accordance with the stated conditions, decreases the amount of contamination present in the index signal produced. It is noted, therefore, that the greater the rate, the less is the contamination of the index signal generated. However, with the increase in the rate, the cathode ray beam must be provided with an impinging area which is smaller and more sharply defined to resolve the closely spaced index structure. Therefore, a compromise rate giving optimum results may be selected for the particular operating conditions and design circumstances encountered. The optimum rate selected for illustration and in connection with which the invention is described is the rate wherein 2½ index elements 30 occur for each triplet group 26, or 5 index elements 30 occur for each pair of triplet elements 26 along the horizontal path of the scanning beam.

It is noted, that at this rate, 5 index elements 30 occur for each 6 segments 20, 22, 24. It is evident that this results in an arrangement of the index elements 30 which may be centered or not with respect to the segments of the pair of triplet groups 26 illustrated. Referring to Figure 1, for example, the first index element 30 appears centered over the red segment 20 of the first triplet group 26, while the third index element 30 overlaps the green segment 24 of the first triplet group 26 and the red segment 20 of the second triplet group 26. Similar arrangements are formed by the segments and elements, when the other respective rates within the conditions of the invention are utilized. The effect of this, in reducing the contamination of the index signal will be evident from the further detailed description and explanations given herein, on connection with Figures 2 to 5 inclusive.

The Figure 2 illustrates the index signal generated by a cathode ray beam of constant current sweeping along a horizontal path and sequentially exciting the segments 20, 22, 24 and the index elements 30 positioned therealong. With the cathode ray beam sweeping from left to right along the horizontal path at a substantially constant rate, the signal peaks 32 are generated in sequence as the beam impinges upon an index element 30. The peaks 32, illustrated in the graph of Figure 2, are positioned under the index elements 30, thereby positionally corresponding to the excitation of the respective element 30. The speed of the cathode ray beam in the horizontal direction is maintained substantially constant during its traverse along its horizontal path.

The Figure 3*a* illustrates the amplitude modification of the current of the cathode ray tube with respect to time for producing a red rendition. Thus, the peaks of cathode ray current occur at a time which results in the energization of the red phosphors 20 of the triplet groups 26. It is noted that the current intensity of the cathode ray beam in its minimum regions 36 preferably does not reach a zero value.

The graph of Figure 3*b* shows that maximum index signal peaks 38 are produced coinciding with two of the maximum peaks 34 of the cathode ray beam current, while minimum peaks 40 are produced by the minimum value of the cathode ray beam in the regions 36. The generated output of the maximum peaks 38 and minimum peaks 40 which are produced under these circumstances result in an output signal with a fundamental component shown by the dashed lines 42. The fundamental signal has a frequency and phase identical to the frequency and phase of the index output signal shown in Figure 2 for constant cathode ray beam current.

In a similar manner, Figure 4*a* illustrates the modification of the cathode ray beam current for producing a green rendition. In this case peaks 44 of maximum current are produced only in coincidence with the green phosphor segments 22.

The resulting maximum peaks 46 of the generated index signal are shown in Figure 4*b*. Neither of the index elements 30 is centered with respect to the green phosphor segments 22, one element 30 occurring later in the first triplet group 26 while the other occurs earlier in the second triplet group 26. Because of this, the main index signal peaks 46 which are produced, are displaced towards each other with respect to the peaks 44 of cathode ray beam current. The main index signal peaks 46, however, are displaced in the direction away from each other with respect to the comparable peaks 32 produced by a constant current shown in Figure 2.

The minor peaks 48 are produced by the minimum value of the cathode ray beam. The minor peaks 48 are in alignment with the peaks 32 shown in Figure 2. Because of the symmetrical displacement of the peaks 46 of Figure 4*b*, the peaks 46 and 48 produce a signal with the fundamental component shown by the dashed lines at 50. The signal 50 has the frequency and phase of the index signal 32 shown in Figure 2.

The modulation of the beam current to provide a blue color rendition is shown by Figure 5*a*. Maximum peaks 52, for this purpose, are produced to occur in coincidence with and centered upon the blue phosphor segments 24.

As shown in Figure 5*b*, this results in a pair of major index signal peaks 54 which are symmetrically displaced away from each other with respect to the index peaks 32 produced by a constant beam current shown in Figure 2.

A plurality of minor peaks 56 are also produced which coincide with the signal peaks 32 shown in Figure 2. The symmetrically displaced major peaks 54 and the minor peaks 56 produce a signal having the fundamental component shown by the dashed lines at 58. This component has a frequency and phase which are identical to those of the output index signal generated by constant current shown in Figure 2.

From the above it is evident that irrespective of the particular color rendered, or any variations in amplitude and phase of the signal modulating the cathode ray beam, an output index signal is produced having a fundamental component with a frequency and phase which are substantially independent of such variations. Thus, the variations produced in the major peaks of the index output signal are cancelled by their symmetrical displacement so that the fundamental component of the resultant index signal remains constantly related to the sweep of the cathode ray beam and its position with respect to the triplet groups 26.

From Figure 2 it is noted that the frequency of the index signal produced differs from the frequency of the triplet groups 26 excited by the cathode ray beam. Thus, for every two triplet groups 26, or every six phosphor segments 20, 22, 24, excited by the cathode ray beam, five peaks 32 are produced in the generated index signal. The frequency of the index signal generated, however, may be converted by appropriate apparatus to have any desired relationship to the rate at which the cathode ray tube scans the triplet groups 26. For example, it is particularly useful to directly correspond the frequency of the index signal derived to the triplet groups 26, so that each peak of the converted index signal designates the sweep of the cathode ray beam over one triplet groups 26. In order to accomplish this, a divider network may be utilized. However, if this were done by ordinary means, the output signal would have an ambiguous phase relationship to the triplet groups 26.

In this particular case, this ambiguity is evident from the relative positions of the peaks 32 of the generated index signal. It is noted, that one of the peaks falls on the red phosphor 20, while another peak occurs between the green and blue phosphor segments 22, 24 while a third peak 32 is generated when the beam impinges partially upon the blue and red phosphors 24, 20. Thus, the peaks 32 of the index signal generated cannot be used alone to indicate the position of the cathode ray beam with respect to the segments 20, 22, 24 of the triplet groups 26. The means provided for resolving this ambiguity is described in connection with Figures 6 and 7.

The Figure 6 illustrates a horizontal section through the portion 14′ of the screen member 14 of the cathode ray tube 12 of the device 10. The portion 14′ is positioned to the left of the screen portion 14. Thus, if the cathode ray beam sweeps along a path from left to right, it will impinge upon the screen member 14′ before it sweeps the portion of its path across the screen member 14.

The inside surface of the screen member 14′ need not be provided with triplet groups 26, but has the aluminum layer 28. The inwardly facing surface of the aluminum layer 28 receives a plurality of parallel horizontally displaced vertical strip index elements 60. The index elements 60 may be formed in the manner already described in connection with the elements 30. The index elements 60 may be made of material identical to that of the index elements 30, but are spaced in the horizontal direction along said path at a rate which is the quotient of the rate of the triplet groups 26 along the path divided by an integer. Thus, a signal generated upon impingement on the elements 60 by the cathode ray beam will have a frequency which is equal to or is a subharmonic of the rate at which the cathode ray beam traverses said triplet groups 26.

In the embodiment illustrated, the phasing index elements 60 occur at a rate which is equal to one-half of the rate of the triplet groups 26 along the horizontal path.

The index signal produced by the impingement of the cathode ray beam as it sweeps to the right along its horizontal path across the screen member 14′ is shown by Figure 7. Although the beam is illustrated to sweep in the direction from left to right, the direction of sweep may be reversed whereupon the screen member 14′ appears on the right so that it is at the beginning of the sweep path of the cathode ray beam. In its sweep along its path, the first signal generated is the phasing signal which takes the form of the peaks 62 shown in Figure 7. The phasing elements 60 are so spaced that they form a continuous equally spaced series with certain of the first index elements 30 which are indicated by 60′ and occur along the path after the phasing elements 60 on the screen member 14. In this manner, a phasing signal is first derived which may be utilized to indicate the relative position of the beam with respect to the various segments 20, 22, 24 of the triplet groups 26.

A system utilizing the unambiguous phasing signal and the ambiguous index signal for producing a continuous unambiguous index signal at triplet frequency will be described in connection with the index system shown in Figure 8.

The Figure 8 illustrates the indexing system of the invention in connection with a schematic representation in block form of a color television system.

The color television system 64 comprises the cathode ray tube 12 having its viewing portion or screen member 14 provided with the triplet groups 26, and index elements 30 and a screen portion 14′ having index elements 60. The Figure 1 is an enlargement of the portion of the screen member 14 within the dashed lines 1, while Figure 6 is an enlargement of a portion within the dashed lines 6. The cathode ray tube 12 is provided with means producing a cathode ray beam including a cathode 68. A control element 70 is adapted to receive the signal over a line 72 for varying the intensity of the cathode ray beam produced. The cathode ray tube 12 is provided with beam deflecting means such as horizontal deflection and vertical deflection magnetic coils which are respectively energized by signals delivered to their terminals 74 and 76. The horizontal and vertical deflection signals are similar to those currently used in television systems, in which the beam is caused to scan rapidly in the horizontal direction and slowly in the vertical direction. The beam, in this case, may be caused to move from left to right at a substantially constant speed while rapidly retracing its path to the beginning of the next horizontal line which is swept from left to right. The vertical deflection signal may cause the beam to sweep slowly from the top to the bottom of the screen member 14, while retracing its path quickly from the bottom to the top. In this manner, a series of substantially horizontal scanning lines are produced which are parallel and are displaced from each other in the vertical direction. Thus, the beam starts along its path in a substantially horizontal direction transverse to the vertical segments of the groups 26 and the vertical strip index elements 30 and 60. At the beginning of each path, the beam impinges upon the phasing index elements 60, and after further travel along the path, it impinges upon the segments of the triplet groups 26 and the index elements 30. In the construction of the cathode ray tube 12, the screen member 14′ which provides the phasing index strip elements 60 is preferably confined to a marginal region on the extreme left of the screen member 14. This area is sufficiently narrow so that it does not substantially interfere with the viewing area of the cathode ray tube 12, while it is sufficiently wide to provide a series of phasing impulses, the purpose of which has already been explained. Of course, if the tube is reversed, the beam may be made to sweep along the path in the opposite direction from right to left. The description of the system utilizing a beam travelling from left to right is merely chosen for the purpose of the simplicity and ease of description.

In the case particularly described herein, the index strips 30 and 60 are made of a short persistence phosphor which produce a light signal when impinged by the cathode ray beam. Of course, this system may also be adapted for use with index elements 30 and 60 providing secondary emission of electrons for generating the index signals.

The photo-electric cell 78 of the index signal detecting means is positioned outside of the cathode ray tube 12 and is energized by the light produced by the index elements 30 and 60 as they are impinged by the cathode ray beam. The signal derived from the photo-electric cell 78 is delivered through a gate circuit 80 to an amplifier 82. The amplifier 82 is tuned to a frequency which is one-half of the triplet frequency. The triplet frequency may be defined as the number of triplet groups 26 impinged by said cathode ray beam in its travel along said path per unit time. The signal from the amplifier 82 is delivered to a frequency doubler circuit 84 of a phasing network 86. The frequency doubler circuit 84 delivers its output signal at triplet frequency to an output line 100.

The output signals from the photo-electric cell 78 are also delivered to an amplifier 88 which is tuned to a frequency of two and one-half times the triplet frequency. The output from the amplifier 88 is delivered to a limiter circuit 90 or an automatic volume control. The output from the limiter 90 is delivered over a line 91 to a frequency mixing circuit 92 of the phasing network 86. The output signal from the limiter 90 is also received by a detector 94 which delivers a reset signal to a multistable or flip-flop circuit 96. The limiter 90 maintains its output signal relatively independent of variations of cathode ray beam current.

The multistable circuit 96 in its reset state delivers a signal to the gate circuit 80 inhibiting the passage of signals to the amplifier 82, while, when placed in its set state by a signal over the input terminals 98, it conditions the gate circuit 80 for passage of index signals.

A second frequency doubling circuit 102 of the phasing network 86 is excited by the output signals on line 100 from the frequency doubling circuit 84, and delivers its output signal over line 104 to the frequency mixing circuit 92. The frequency mixing circuit 92 upon receiving input signals over the lines 91 and 104 delivers an output signal at one-half the triplet frequency to line 106 which excites the frequency doubling circuit 84.

In the operation of the detecting and phasing means, the set terminal 98 is adapted to receive a synchronizing pulse at the beginning of each horizontal scanning line of the cathode ray beam. The set signal causes the flip-flop 96 to deliver a gating signal to the gate circuit 80. The first index signals generated by the cathode ray tube 12 are those from the phasing elements 60 which have a frequency of one-half of the triplet frequency. Although this signal is delivered to the input of the amplifier 88, since this amplifier is tuned to a frequency two and one-half times the triplet frequency, it does not deliver an output signal. This signal, however, is also delivered through the gate 80 to the amplifier 82 which is tuned to the frequency of the incoming signal and passes it to the frequency doubling circuit 84 of the phasing network 86. This energizes the doubler 84 which produces an output signal at triplet frequency. This output signal excites the second frequency doubling circuit 102. The frequency doubling circuit 102 delivers an output signal having a frequency two times the triplet frequency which is received by the frequency mixer 92. Since the input line 91 to the mixer 92 is not energized at this time, an output beat signal is not produced by the mixer 92.

When the scanning beam moves along its path so that it impinges upon the index elements 30, an output signal is produced having a frequency which is two and one-half times the triplet frequency. This signal which is detected by the photo-electric cell 78 is delivered to the amplifier 88 which now delivers an output signal to the limiter 90. The signal from the limiter 90 is received by the detector circuit 94 which delivers a signal to the flip-flop circuit 96 resetting it. The flip-flop 96 in its reset position prevents the passage of index signals through the gate 80 to the amplifier 82.

The output signal at two and one-half times the triplet frequency is also delivered over the line 91 to the mixer 92. The receipt of signals from both of the input lines 91 and 104 allows the mixer circuit 92 to produce an output beat signal which is a difference of their frequencies. The output beat signal has a frequency which is one-half of the triplet frequency. This is delivered over the line 106 to the frequency doubling circuit 84.

The frequency doubling circuit 84 which was previously energized by unambiguous signals derived from the amplifier 82 is now energized by signals received over the line 106 from the frequency mixing circuit 92. The signals received over line 106 have the same frequency and phase as the signals originally derived from the amplifier 82. Therefore, the output signal from the doubler 84 which is at triplet frequency unambiguously maintains its phase as previously determined by the original phasing index signals.

From the above it is evident that by utilizing the initial phasing signals which unambiguously determine the phase of the index signal at triplet frequency, the ambiguous index signals derived thereafter at two and one-half times the triplet frequency may be utilized to continue to produce and deliver to the output line 100 the unambiguous signal at triplet frequency. It is noted, however, that the index signals derived from the index elements 30 must not be interrupted since this might result in the production of an output signal on line 100 which does not have the phase relationship originally established. Clipping means which have been provided to avoid interruption of the generated index signal will be described hereinafter.

It is noted that the phasing network 86 is locked into the proper phase relationship at the initiation of each scanning line or path. This locked relationship is maintained throughout the remainder of the scan of the path, although the network 86 is driven by the ambiguous signals occurring at the frequency of two and one-half times the triplet frequency.

A synchronizing pulse which occurs at the termination of the scanning path sets the flip-flop 96 to allow the gate 80 to pass phasing signals to the amplifier 82. Signals are prevented from reaching the amplifier 82 as soon as its initiating operation of locking the phasing network 86 has been accomplished. This automatically results soon after index signals are received at the frequency rate of two and one-half times the triplet frequency. This assures the delivery of energization to the phasing network 86 without interruption from its initial to its final state of operation. Since signals from the amplifier 82 have no further function, but might interfere with the operation of the phasing network 86, this is prevented by the arrangement disclosed.

The output signal at triplet frequency delivered at the output line 100 of the phasing network 86, since it is unambiguously related to the position and sweep of the cathode ray beam along its path, may be used for many purposes. For example, the signal in line 100 may be used to control the horizontal sweep speed, or the sampling of a video signal to the control electrode 70 of the cathode ray tube 12. The signal on line 100 may be used to control the sampling of three separate color signals to sequentially deliver them in a predetermined desired order. The signal on line 100 may also be used by heterodyning it with an incoming color carrier. This latter use shall now be described in greater detail, although the other uses of the index signal on line 100 are equally suitable for particular design circumstances and requirements.

The signal on output line 100 of the phasing network 86 is delivered to a mixing circuit 108 which is also provided with a terminal 110 adapted to receive a color reference signal. The color reference signal may be that at approximately 3.58 megacycles currently used as a standard. Such a color reference signal has been described and defined in detail in connection with the established color television standards.

The output signal from the mixer 108 is delivered over a line 112 to a second mixer 114 which is adapted to receive a chroma signal at its input terminal 116. The chroma signal delivered to terminal 116 may be the standard signal as defined by the current legal requirements for transmission. This would be a signal having a frequency of the color reference signal of approximate 3.58 megacycles. The amplitude of the chroma signal is modulated to give the saturation of the color to be rendered, while the phase of the signal is varied with respect to the phase of the color reference signal to determine the hue of the color to be rendered. The signal which is delivered to the output line 118 of the frequency mixer circuit 114 has a frequency which is the triplet frequency, an amplitude corresponding to the saturation of the color being rendered and a phase variation or modulation corresponding to the hue of the color to be rendered.

It is readily evident how this output signal on line 118 is produced by the heterodyning action of the mixing circuits 108 and 114. For example, a sum frequency signal may be derived from the mixer 108 by the mixing of the signals on the input lines 100 and 110. This signal alone is permitted to appear at the output line 112. This frequency selection may be accomplished by an appropriate filter network incorporated with the mixer circuit 108. This signal also has a phase which is the sum of the phases of the signals on the lines 100 and 110.

The output signal from the mixer 114 may now be the difference of the frequencies appearing upon its input lines 112 and 116. This results in an output frequency which is equal to the triplet frequency appearing on the line 100, while its phase is varied by the difference in the phase between the chroma signal appearing on the input terminal 116 and the phase of the color reference signal delivered to the input terminal 110. The amplitude of the output signal on line 118 also varies with changes in the amplitude of the chroma signal delivered to terminal 116. In this manner, a composite color signal is delivered at the output line 118 at triplet frequency having its amplitude and phase varied to respectively correspond to the saturation and hue of the color to be presented.

As a representative example of satisfactory operating frequencies, the cathode ray beam may sweep the triplet groups 26 at a rate to produce a triplet frequency of 5.4 megacycles. From this, the phasing signal, which is one-half of the triplet frequency is 2.7 megacycles and the index signal which is 2.5 times the triplet frequency has a frequency of 13.5 megacycles.

Thus, the signals delivered from the amplifier 82 to the frequency doubling circuit 84 are the unambiguous signals occurring at a frequency of 2.7 megacycles, which are doubled and delivered at the triplet frequency of 5.4 megacycles to the output line 100. The exciting signal for the second doubler 102 is at the triplet frequency and is doubled to a frequency of 10.8 megacycles and delivered to the line 104. The frequency delivered over the line 91 to the mixer 94 is the index signal occurring at a frequency of 13.5 megacycles. The difference beat signal delivered by the mixer 92 on the line 106 therefore has the frequency of 2.7 megacycles. This frequency occurs in the proper phase relationship and is doubled to the triplet frequency by the doubling circuit 84.

The signal delivered to the output line 100 may be represented by the following equation:

$$E_t = \cos 2\pi 5.4t$$

where the amplitude of the wave is equal to one and the phase angle is equal to zero, and where $t$ is in microseconds.

Although the color reference and chroma signals respectively delivered to the input terminals 110 and 116 of the mixers 108 and 114 may be heterodyned with a carrier frequency, they may respectively be represented without such heterodyning by the following equations:

$$E_R = A \cos (2\pi 3.58t - \theta_2)$$
$$E_c = X \cos (2\pi 3.58t - \theta_3)$$

The output signal delivered on line 112 of the mixer 108 may be represented as follows:

$$E_{t+R} = A \cos (2\pi 8.98t - \theta_2)$$

The difference beat frequency signal delivered by the mixer circuit 114 to line 118 may be represented by the following equation:

$$E_{t+R-C} = AX \cos [2\pi 5.4t - (\theta_2 - \theta_3)]$$

In the above equation, it is noted that the signal derived on line 118 is at the triplet frequency of 5.4 megacycles, the amplitude of the signal varies with the changes of the amplitude of the chroma signal, while its phase is modulated and varies with the change in the difference between the phases of the reference and chroma color signals.

The signal on line 118 is delivered to an adder 120 which is also adapted to receive a Y or luminescence signal from an input terminal 122 through a clamp or clipping circuit 124. The clipping circuit 124 prevents the excursion of the luminescent signal below a minimum level. This may easily be done by a clamping diode valve. The purpose of this is to prevent the signal which is delivered to the control electrode 70 of the cathode ray tube 12 from cutting off the cathode ray beam. It is important that such cut-off does not occur for a length of time exceeding the memory of the phasing network 86, since this would interrupt the generation of index signals. The output signal produced by the adder 120 is delivered to the line 126. The signal on line 126 comprises the signal occurring on the line 118 to which has been added a D.C. level corresponding to the luminescent signal delivered to the input terminal 122. The clipper network 124 provides a minimum D.C. level which is sufficient to prevent cut-off of the cathode ray beam of the tube 12 for extended periods of time. The luminescent signal determines the brillance or brightness of the color presentation. For example, the more positive the D.C. level of the signal on line 126 the greater will be the current of the beam which will result in a brighter rendition.

If the input signals to the terminals 110, 116 and 122 are received in the manner specified by the standards of communication presently established in the United States of America, the color reference signal will be derived from an apparatus receiving a signal burst modulated upon the normalizing synchronizing pulses at the frequency of 3.58 mc. establishing a reference phase. The chroma signal information is presented at times between the synchronizing pulses at a frequency of 3.58 mc. concurrently with the presentation of the Y or luminescence signal which is sufficiently contained in a frequency range below 3.58 megacycles. By use of appropriate filters the luminescence or Y signal may be easily separated from the chroma signal. For remote transmission and detection these signals may be modulated upon an appropriate carrier signal positioned within a predetermined band.

The output color information signal on the line 126 may be delivered to a second adder circuit 128 which may receive at its input terminal 130 a return blanking signal which cuts off the electron beam during retrace periods. Since index signals are not derived during the retrace periord nor is any color rendition upon the screen desirable at this time, the addition of the blanking signal does not in any way interfere with the proper operation of the system, but appropriately modulates the input signal on line 126 to deliver a desired output signal to the line 72. The return blanking signal is of substantially square wave configuration and may be derived from a source within the television system by the conventional means.

The signal delivered to the line 72 is modulated in a manner to produce color information upon the screen member 14 of the cathode ray tube 12 conforming to the color information derived or supplied to the color television system 64.

In operation of the color television system 64, when the beam cathode ray tube starts its sweep, a phasing signal is initially derived followed by an indexing signal which during the remainder of the path results in an output signal at triplet frequency corresponding to the position and rate of traverse of the beam with respect to the triplet groups 26. The mixers 108, 114 and the adders 120, 128 produce a modulated signal which controls the hue, saturation and brillance of the color presented. For example, if the phase of the index signal delivered to the electrode 70 is such that the peak current is produced at the time the electron beam impinges upon the red phosphor segments 20 as illustrated by Figure 3*a*, a red color will be produced. The saturation of the red color will depend upon the intensity of the index signal, while the brilliance of the rendition will correspond to the D.C. value of the current on the grid 70. In order to produce a green color, the phase of the index signal is shifted so that the beam at maximum intensity impinges upon the green phosphor segments 22. If a color intermediate or comprising a mixture of red and green is to be produced, the phase is shifted toward the green in the amount necessary to produce that hue. Of course, if black and white information is merely to be produced the index signal vanishes while the luminescence signal, which is the D.C. value of the signal on the control electrode 70, varies the beam current with which all of the phosphors are impinged. The mixture of the three colors under these conditions visually produces white light of various brilliance.

In the above description, it has been assumed that the phasing around the loop from the generation of the index signals detected by the photo-electric cell 78 to the delivery of the signal to the control electrode 70 and the impingement of the beam upon the triplet groups 26 is zero degrees or a multiple of 360°. Of course, this can easily be accomplished by an appropriate phase shifting network for adding sufficient delay around the circuit. This also may be affected by appropriate misregistration of the index elements 30 and 60 to compensate for the delay around the loop.

This system may also be provided with phosphor segments 20, 22, 24 of various widths to compensate for the inefficiency of light production by various phosphors. If this is done an appropriate circuit may be incorporated to correspondingly modify the phase angle shifts in the output signal on line 118 to compensate for the variations in the widths of the phosphor segments 20, 22, 24 of the groups 26.

It is noted that the color television system 64 provides a simple and efficient manner for producing color renditions of high fidelity in an efficient and relatively inexpensive manner. Other systems have failed to accomplish this because of the resulting contamination produced in their generated indexing signals upon variations in the color to be rendered.

Although the invention has been specifically described in connection with a cathode ray tube and a color television system, the invention is of general utility in connection with indexing devices and systems.

It will, of course, be understood that the description and drawings, herein contained, are illustrative merely, and that various modifications and changes may be made in the structure disclosed without departing from the spirit of the invention.

What is claimed is:

1. An index signal generating means comprising a plurality of signal producing segments arranged in groups occurring at a predetermined rate along a specified path, means sequentially exciting said groups of segments along said path, and an index signal generating device excited by said means at a frequency which is the product of a non-integral number greater than one multiplied by the frequency at which said groups are excited by said means.

2. An index signal generating means comprising a plurality of signal producing segments arranged in groups occurring at a predetermined rate along a specified path of excitation, means sequentially exciting said groups of segments along said path, and a plurality of index signal generating elements arranged to occur at a predetermined rate along said path for sequential excitation by said means concurrent with the excitation of said groups, the rate of said elements along said path being the product of a non-integral number greater than one multiplied by the rate of said groups along said path.

3. An index signal generating means comprising a plurality of segments each producing light of one of several predetermined colors when excited and arranged in substantially identical groups occurring at a predetermined rate along a specified path of excitation, means sequentially exciting said groups of segments along said path, and a plurality of index signal generating elements arranged to occur at a predetermined rate along said path for sequential excitation by said means concurrent with the excitation of said groups, the rate of said elements along said path being the product of a non-integral number between one and five multiplied by the rate of said groups along said path.

4. An index signal generating means comprising a plurality of strip segments each producing light of one of several predetermined colors when excited and arranged in sequence according to color generation forming identical groups occurring at a predetermined rate along a specified path of excitation traversing said segments, means sequentially exciting said groups of segments along said path, and a plurality of index signal strip elements arranged parallel with said strip segments to occur at a predetermined rate along said path for sequential excitation by said means concurrent with the excitation of said groups, the rate of said elements along said path being the product of an odd integer between two and eight multiplied by one-half of the rate of said groups along said path.

5. An index signal generating means comprising a plurality of laterally disposed strip segments each producing light of one of three predetermined colors when excited and arranged in sequence according to color generation forming substantially identical triplet groups occurring at a predetermined rate along a specified path of excitation traversing said segments, means sequentially exciting said groups of segments along said path, and a plurality of index signal strip elements arranged parallel with said strip segments to occur at a predetermined rate along said path for sequential excitation by said means concurrent with the excitation of said groups, the rate of said elements along said path being two and one-half times the rate of said groups along said path.

6. A cathode-ray tube comprising a member having a plurality of signal producing segments arranged in groups occurring at a predetermined rate along a specified path, means providing a cathode ray beam for sequentially exciting said groups of segments along said path, and an index signal generating device excited by said beam at a frequency which is the product of a non-integral number greater than one multiplied by the frequency at which said groups are excited by said means.

7. A cathode-ray tube comprising a member having a plurality of signal producing segments arranged in groups occurring at a predetermined rate along a specified path of excitation, means providing a cathode ray beam for sequentially exciting said groups of segments along said path, and a plurality of index signal generating elements arranged to occur at a predetermined rate along said path for sequential excitation by said beam concurrent with the excitation of said groups, the rate of said elements along said path being the product of a non-integral number greater than one multiplied by the rate of said groups along said path.

8. A cathode-ray tube comprising a screen member having a plurality of segments each producing light of one of several predetermined colors when excited and arranged in substantially identical groups occurring at a predetermined rate along a specified path of excitation, and means providing a cathode-ray beam for sequentially exciting said groups of segments along said path, said screen member being provided with a plurality of index signal generating elements arranged to occur at a predetermined rate along said path for sequential excitation by said beam concurrent with the excitation of said groups, the rate of said elements along said path being the product of a non-integral number between one and three multiplied by the rate of said groups along said path.

9. An index signal generating means comprising a plurality of signal producing segments arranged in groups occurring at a predetermined rate along a specified path, means sequentially exciting said groups of segments along said path, a first index signal generating device excited by said means at a frequency which is the product of a non-integral number greater than one multiplied by the frequency at which said groups are excited by said means, and a second index signal generating device being excited before said first device at a frequency which is the quotient of the frequency at which said groups are excited by said means divided by an integer.

10. An index signal generating means comprising a plurality of signal producing segments arranged in groups occurring at a predetermined rate along a specified path, means sequentially exciting said groups of segments along said path, a plurality of first index elements arranged to occur at a predetermined rate along a specified path for sequential excitation by said means, said first elements being excited by said means at a frequency which is the product of a non-integral number greater than one multiplied by the frequency at which said groups are excited by said means, and a plurality of second index elements arranged to occur at a predetermined rate along said path preceding said first elements for sequential excitation by said means before excitation of said first elements, said second elements being excited by said means at a frequency which is the quotient of the frequency at which said groups are excited by said means divided by an integer.

11. An index signal generating means comprising a plurality of signal producing segments arranged in groups occurring at a predetermined rate along a specified path of excitation, means sequentially exciting said groups of segments along said path, a plurality of first index elements arranged to occur at a predetermined rate along said path for sequential excitation by said means concurrent with the excitation of said groups, the rate of said first elements along said path being the product of a non-integral number greater than one multiplied by the rate of said groups along said path, and a plurality of second index elements arranged to occur at a predetermined rate along said path preceding said first elements for sequential excitation by said means before excitation of said first elements, the rate of said second elements along said path being the quotient of the rate of said groups along said path divided by an integer.

12. An index signal generating means comprising a plurality of segments each producing light of one of several predetermined colors when excited and arranged in substantially identical groups occurring at a predetermined rate along a specified path of excitation, means sequentially exciting said groups of segments along said path, a plurality of first index elements arranged to occur at a predetermined rate along said path for sequential excitation by said means concurrent with the excitation of said groups, the rate of said first elements along said path being the product of a non-integral number between one and five multiplied by the rate of said groups along said path, a plurality of second index elements arranged to occur at a predetermined rate along said path preceding said first elements for sequential excitation by said means before excitation of said first elements, the rate of said second elements along said path being the quotient of the rate of said groups along said path divided by an integer.

13. An index signal generating means comprising a plurality of strip segments each producing light of one of several predetermined colors when excited and arranged in sequence according to color generation forming substantially identical groups occurring at a predetermined rate along a specified path of excitation traversing said segments, means sequentially exciting said groups of segments along said path, a plurality of first index strip elements arranged parallel with said strip segments to occur at a predetermined rate along said path for sequential excitation by said means concurrent with the excitation of said groups, the rate of said first elements along said path being the product of an odd integer between two and eight multiplied by one-half of the rate of said groups along said path, and a plurality of second index strip elements arranged parallel with said strip segments to occur at a predetermined rate along said path preceding said first elements for sequential excitation by said means before excitation of said first elements, the rate of said second elements along said path being the quotient of the rate of said groups along said path divided by an integer.

14. An index signal generating means comprising a plurality of laterally disposed strip segments each producing light of one of three predetermined colors when excited and arranged in sequence according to color generation forming substantially identical triplet groups occurring at a predetermined rate along a specified path of excitation traversing said segments, means sequentially exciting said groups of segments along said path, a plurality of first index strip elements arranged parallel with said strip segments to occur at a predetermined rate along said path for sequential excitation by said means concurrent with the excitation of said groups, the rate of said elements along said path being the product of an odd integer between two and eight multiplied by one-half of the rate of said groups along said path, and a plurality of second index strip elements being a continuation of certain of said first elements occurring at a predetermined rate along said path preceding said first elements for sequential excitation by said means before excitation of said first elements, the rate of said second elements along said path being one-half of the rate of said groups along said path.

15. A cathode-ray tube comprising a member having a plurality of signal producing segments arranged in groups occurring at a predetermined rate along a specified path, means providing a cathode-ray beam for sequentially exciting said groups of segments along said path, a first index signal generating device excited by said beam at a frequency which is the product of a nonintegral number greater than one multiplied by the frequency at which said groups are excited by said means, and a second index signal generating device excited by said beam immediately preceding said first device at a frequency which is a sub harmonic of the frequency of said first device.

16. A cathode-ray tube comprising a member having a plurality of signal producing segments arranged in groups occurring at a predetermined rate along a specified path of excitation, means providing a cathode-ray beam for sequentially exciting said groups of segments along said path, a plurality of first index elements arranged to occur at a predetermined rate along said path for sequential excitation by said beam concurrent with the excitation of said groups, the rate of said elements along said path being the product of a non-integral number greater than one multiplied by the rate of said groups along said path, and a plurality of second index elements arranged to occur at a predetermined rate along said path preceding said first elements for sequential excitation by said means before excitation of said first elements, the rate of said second elements along said path being the quotient of the rate of said groups along said path divided by an integer.

17. A cathode-ray tube comprising a screen member having a plurality of segments each producing light of one of several predetermined colors when excited and arranged in substantially identical groups occurring at a predetermined rate along a specified path of excitation, and means providing a cathode-ray beam for sequentially exciting said groups of segments along said path, said screen member being provided with a plurality of first index elements arranged to occur at a predetermined rate along said path for sequential excitation by said beam concurrent with the excitation of said groups, the rate of said first index elements along said path being the product of a non-integral number between one and three multiplied by one-half of the rate of said groups along said path, said screen member being provided with a plurality of second index elements arranged to occur at a predetermined rate along said path preceding said first elements for sequential excitation by said beam before excitation of said first elements, the rate of said second elements along said path being the quotient of the rate of said groups along said path divided by an integer.

18. A cathode-ray tube comprising a screen member having a plurality of parallel laterally displaced strip segments each producing light of one of three predetermined colors when excited and arranged in sequence according to color generation forming identical triplet groups occurring at a predetermined rate along a specified path of excitation traversing said segments, and means providing a cathode-ray beam for sequentially exciting said groups of segments along said path, said screen member being provided with a plurality of first index strip elements arranged parallel with said strip segments to occur at a predetermined rate along said path for sequential excitation by said beam concurrent with the excitation of said groups, the rate of said first index elements along said path being the product of an odd integer between two and eight multiplied by one-half of the rate of said groups along said path, said screen member being provided with a plurality of second index strip elements being a continuation of certain of said first elements occurring at a predetermined rate along said path preceding said first elements for sequential excitation by said beam before excitation of said first elements, the rate of said second elements along said path being one-half of the rate of said groups along said path.

19. A cathode-ray tube comprising a screen member having a plurality of parallel laterally disposed vertical strip segments each producing light of one of three predetermined colors when excited and arranged in sequence according to color generation forming substantially identical triplet groups occurring at a predetermined rate along substantially horizontal paths of excitation traversing said segments, and means providing a cathode-ray beam for scanning said screen member and sequentially exciting said groups of segments along said paths; said screen member being provided with a plurality of first index strip elements arranged parallel with said strip segments to occur at a predetermined rate along said paths for sequential excitation by said beam concurrent with the excitation of said groups; the rate of said first index elements along said paths being two and one-half times the rate of said groups along said paths; said screen member being provided with a plurality of second index strip elements being a continuation of certain of said first elements occurring at a predetermined rate along said paths preceding said first elements for sequential excitation by said beam before excitation of said first elements; the rate of said second elements along said paths being one-half of the rate of said groups along said paths.

20. A cathode ray tube comprising a transparent face plate, a plurality of periodic groups of luminscent triplet color strips on said face plate, a conducting film on top of said triplet groups, and a group of index strips in a first region having a periodicity equal to an integral fraction less than one times the period of said triplet groups and having in a second region a periodicity equal to an integral multiple of the period of said triplet groups.

References Cited in the file of this patent

UNITED STATES PATENTS

| | | |
|---|---|---|
| 2,476,698 | Clapp | July 19, 1949 |
| 2,740,065 | Jestry | Mar. 27, 1956 |
| 2,743,312 | Bingley | Apr. 24, 1956 |
| 2,767,346 | Hoyt | Oct. 16, 1956 |
| 2,771,503 | Schwartz | Nov. 20, 1956 |
| 2,771,567 | Weimer | Nov. 20, 1956 |
| 2,778,971 | Sunstein | Jan. 22, 1957 |